United States Patent
Kurian et al.

(10) Patent No.: US 10,754,697 B2
(45) Date of Patent: Aug. 25, 2020

(54) SYSTEM FOR ALLOCATING RESOURCES FOR USE IN DATA PROCESSING OPERATIONS

(71) Applicant: BANK OF AMERICA CORPORATION, Charlotte, NC (US)

(72) Inventors: Manu Jacob Kurian, Dallas, TX (US); Paul Grayson Roscoe, Treuddyn (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 342 days.

(21) Appl. No.: 15/882,175

(22) Filed: Jan. 29, 2018

(65) Prior Publication Data

US 2019/0235921 A1    Aug. 1, 2019

(51) Int. Cl.
*G06F 9/50* (2006.01)
*G06F 8/60* (2018.01)

(52) U.S. Cl.
CPC ............... *G06F 9/505* (2013.01); *G06F 8/60* (2013.01); *G06F 9/5072* (2013.01); *G06F 2209/508* (2013.01); *G06F 2209/5019* (2013.01)

(58) Field of Classification Search
CPC .......... G06F 9/505; G06F 9/5072; G06F 2209/5019; G06F 2209/508; G06F 8/60
See application file for complete search history.

(56) References Cited

U.S. PATENT DOCUMENTS

| | | |
|---|---|---|
| 6,711,616 B1 * | 3/2004 | Stamm .................. G06F 9/5066 709/226 |
| 6,868,441 B2 | 3/2005 | Greene et al. |
| 7,283,935 B1 | 10/2007 | Pritchard et al. |
| 7,401,131 B2 | 7/2008 | Robertson et al. |
| 7,516,221 B2 | 4/2009 | Souder et al. |
| 7,584,281 B2 | 9/2009 | Bernardin et al. |
| 7,765,552 B2 | 7/2010 | Miller et al. |
| 7,870,568 B2 | 1/2011 | Bernardin et al. |
| 7,882,200 B2 | 2/2011 | Sturrock et al. |
| 8,140,624 B2 | 3/2012 | Gingell et al. |
| 8,140,666 B2 | 3/2012 | Dias et al. |
| 8,195,739 B2 | 6/2012 | Bernardin et al. |
| 8,655,997 B2 | 2/2014 | Eilam et al. |
| 9,542,222 B2 | 1/2017 | Mousseau et al. |
| 9,684,534 B2 | 6/2017 | Mandava et al. |

(Continued)

*Primary Examiner* — Duy Khuong T Nguyen
*Assistant Examiner* — Kevin X Lu
(74) *Attorney, Agent, or Firm* — Michael A. Springs; Moore & Van Allen PLLC; James C. Edwards (57) ABSTRACT

A system, method and the like for allocating computing resources to data processing services/applications based on the current or foreseen usage/load of the computing resources. The elastic nature of the computing resource grid allows for expansion or contraction of ancillary use of the computing resources depending on the data processing requirements and computer resource usage. Further, virtual binary codes are deployed on the computing resources, which are executed at the application layer and configured to be removed upon completion of a job or in the event that the usage state of the computing resource dictates such. The removal of the virtual binary codes from the computing resources provides for no residual effect on the computing resources (i.e., no code remains in computing resource memory and, as such no processing capabilities are subsequently used).

18 Claims, 5 Drawing Sheets

(56) References Cited

U.S. PATENT DOCUMENTS

| | | |
|---|---|---|
| 10,462,024 B1* | 10/2019 | Kavanagh ............. G06F 9/5027 |
| 2006/0210051 A1 | 9/2006 | Tomisawa |
| 2008/0155100 A1 | 6/2008 | Ahmed et al. |
| 2010/0005473 A1 | 1/2010 | Blanding et al. |
| 2012/0246202 A1 | 9/2012 | Surtani et al. |
| 2013/0179894 A1* | 7/2013 | Calder ................. G06F 9/5027 |
| | | 718/104 |
| 2014/0189703 A1* | 7/2014 | Gilder .................. G06F 9/5027 |
| | | 718/104 |
| 2015/0212840 A1 | 7/2015 | Biran et al. |
| 2015/0378785 A1* | 12/2015 | Tarasuk-Levin ...... G06F 9/4881 |
| | | 718/1 |
| 2016/0019074 A1 | 1/2016 | Nahir et al. |
| 2016/0277311 A1 | 9/2016 | Challa et al. |
| 2019/0044823 A1* | 2/2019 | Soundararajan ........ H04L 43/50 |
| 2019/0102213 A1* | 4/2019 | Yousaf .................... G06N 5/04 |

\* cited by examiner

SYSTEM FOR ALLOCATING RESOURCES FOR USE IN DATA PROCESSING OPERATIONS

FIELD OF THE INVENTION

The present invention is generally directed to computer data processing and, more specifically, allocating computing resources for use in data processing based on current and/or foreseen usage of the computing resources.

BACKGROUND

Most large computing systems (e.g., an enterprise-wide computing system including a plurality of servers, data storage devices and the like) are built on a monolithic architecture model. In this regard, the computing systems are created as a service mesh; i.e., servers or the like are created/deployed and services/applications are installed on the servers by creating a service layer. Such deployment of additional computing resources may include, adding physical computing resources (e.g., servers, data storage devices or the like), or virtual use of the physical computing resources. Such virtual use may include deploying Virtual Machines (VMs) the physical computing resources and/or deploying operating system-level virtualization, such as containers. VMs provide for creating virtual kernels on physical computing resources, while containers create virtual application layers that run on a single kernel.

Such monolithic computing systems typically are not efficient in terms of computing resource utilization, since new services and/or a higher service demand typically result in deploying additional computing resources. While conventional virtual use of computing resources (e.g., VMs or containers) can be advantageous in terms of allocating resources based on service demand, such virtual use still requires resource usage (e.g., memory or processor/CPU) even after the service usage. Specifically, conventional virtual use, such as VMs, require deployment of an agent that remains in memory after the service has executed and, in some instances the agent that remains is running in a stand-by/sleep mode. Similarly, with use of containers, the container, and the agent deployed in the container, remain in memory after the service has executed. In such instances, the agent remains in the memory and may persist in a executing or stand-by mode in order for the agent to subsequently receive commands and execute as a response to the commands.

Therefore, a need exists to develop a computing system architecture that is highly elastic in nature so as to support on-demand use of computing resources for data processing operations based on the current and/or foreseen usage of the computing resources. In addition, a need exits to be able to implement a computing system architecture that is able to dynamically address increases in service demand without having to deploy additional computing resources, i.e., either additional physical resources and/or virtual resources. In this regard, a need exists to be able provide for virtual use of computing resources absent the need for agents, containers or the like that persist at the physical computing resource after the service is no longer running.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing systems, methods, computer program product and/or the like for allocating computing resources to data processing services based on the current or foreseen usage of the computing resources. In this regard the present invention monitors the current and foreseen usage of computing resources, such as servers and the like, and assigns data processing services/applications to those computing resources that are currently, and will be for the foreseen future, underutilized.

Thus, the present invention allows for of network of computing resources to act as a large elastic grid in which data processing services/applications can be deployed to computing resources in both horizontal and vertical fashion, such that, the grid is able to expand or contract as data processing services/applications and computing resource usage warrant. In this regard, horizontal deployment provides for the data processing service/application to be deployed based on block/work type, while vertical deployment provides for the data processing service application to be deployed based on work requirements (e.g., memory requirements, processing/CPU requirements and the like). As such, the present invention is able to call upon any computing resource within the network to perform data processing services/applications as demand dictates.

Additionally, the present invention provides for parasitic-like deployment of virtual binary codes (i.e., "agent") at the computing resources, such that, the execution of the data processing services/applications at the computing resources occurs without any residual effect on the computing resources. In this regard, once the virtual binary codes have been deployed and executed on the computing resources, the present invention provides for the codes to be called-back or otherwise removed from the computing resources without any post-processing effect on the computing resources. In this regard, unlike convention Virtual Machines (VMs) or operating system-level virtualization, such as containers, no portion of the virtual binary codes remain in the computing resource memory nor are computing resource processing capabilities called upon once the virtual binary codes have been removed.

Moreover, the present invention monitors current and foreseen usage/load of the computing resources, such that, as the usage/load increases, or is foreseen to increase, on computing resources, the data processing services/applications being executed on those computing resources can be dynamically redeployed and executed on other computing resources having current or foreseen usage capacity. In this regard, the virtual binary codes associated with a data processing service/application may be deployed and executed on first computing resources and as the usage on the first computing resources increases or is foreseen to increase, the virtual binary codes may be removed from the first computing resources and redeployed and executed at second computing resources that have been determined to have the requisite usage capacity. Such dynamic redeployment of the virtual binary codes allows for the data processing job and/or block to be stopped at the initial computing resources and continued at the re-deployed computing resources.

A system for allocating computing resources to data processing services defines first embodiments of the invention. The system includes a plurality of computing resources disposed within a distributed computing network and a database configured to store sets of virtual binary codes. Each set of virtual binary codes is configured to perform a data processing service.

The system additionally includes a computing platform including a memory device with computer-readable program code stored thereon and at least processor device in communication with the memory device. The at least one processor is configured to execute the computer-readable program code to (i) receive a plurality of jobs requiring execution by the computing resources, each job associated with at least one of a plurality of data processing services, (ii) monitor a usage state of each of the computing resources and (iii) determine one or more of the computing resources to allocate to each of the plurality of jobs based on the usage state of each of the computing resources. The usage state defines a level of use of a computing resource and is associated with at least one of a current time and an upcoming period of time.

In response to determining the one or more computing resources to allocate to each of the plurality of jobs, the at least one processor is further configured to execute the computer-readable program code to (iv) access the database to retrieve a plurality of the sets of virtual binary codes, each sets of virtual codes associated with the at least one of the plurality of data processing services, and (v) deploy the plurality of the sets of virtual binary codes to the one or more computing resources allocated to each of the plurality of jobs, wherein the deployed sets of virtual binary codes are executed at the application layer of the one or more computing resources.

In response to (i) completing a job, or (ii) the usage state indicating a predetermined usage level at one of the one or more computing resources, the at least one processor is further configured to execute the computer-readable program code to (vi) remove (i.e., call-back) a set of virtual binary codes from the one of the computing resources. Removing the set of virtual binary codes provides for no further use of memory or processing capabilities of the one or more computing resources by the data processing service.

In specific embodiments of the system, the at least one processor is configured to execute the computer-readable program code to receive the plurality of jobs requiring execution by the computing resources, each job including one or more blocks, each block comprising one or more work units. In such embodiments of the system, the at least one processor is configured to execute the computer-readable program code to determine the one or more of the computing resources to allocate to each of the one or more blocks of the plurality of jobs based further on a type of the job or type of the one or more blocks. In other such embodiments of the system, the at least one processor is configured to execute the computer-readable program code to determine the one or more of the computing resources to allocate to each of the one or more blocks of the plurality of jobs based further on work requirements of the job or the block in comparison to work requirement usage state of each of the computing resources. The work requirements of the block include one or more of memory requirements and processing requirements.

In other specific embodiments of the invention, in which the job includes more than one block with at least two of the blocks being deployed and executed at different computing resources, the at least one processor is further configured to execute the computer-readable program code to systematically compile results of each block of a job performed at the different computing resources. Such systematical compiling of the results may include at least one of compiling the results of different types of work blocks and compiling the results of blocks having different work requirements.

In further specific embodiments of the system, the at least one processor is further configured to execute the computer-readable program code to (ii) monitor the usage state of each of the computing resources including determining the usage state of a computing resource has met the predetermined usage level for the upcoming period of time, and, in response to such a determination, (viii) determine a second computing resources to re-allocate to one or more of the plurality of jobs based on the usage state of the second computing resource.

In such embodiments of the system, in response to determining the usage state of a computing resource has met the predetermined usage level for the upcoming period of time, the at least one processor may be further configured to execute the computer-readable program code to, (ix) determine a checkpoint in the sets of virtual binary codes, wherein the checkpoint indicates a stopping point for completing execution of the virtual binary codes at the computing resources prior to re-allocation to the second resource. In such embodiments of the system, in response to determining that the set of binary codes has reached the checkpoint at the computing resource, the at least one processor is further configured to execute the computer-readable program code to (x) remove the set of virtual binary codes from the computing resources, (xi) deploy the set of virtual binary codes at the second computing resource, and (xii) execute, from a point beyond the checkpoint, the set of virtual binary codes at the second computing resource. In such embodiments of the system, the checkpoint may be stored in the virtual binary codes or the checkpoint may communicated to the second computing resource prior to executing the set of virtual binary codes at the second computing resource.

In other embodiments of the invention, the at least one processor is configured to execute the computer-readable program code to communicate results of the job to a central repository.

A method for allocating computing resources to data processing services defines second embodiments of the invention. The method is implemented by one or more computing processors. The method includes (i) receiving a plurality of jobs requiring execution by one or more of a plurality of computing resources, each job associated with at least one of a plurality of data processing services, (ii) monitoring a usage state of a plurality of computing resources, and (iii) determining one or more of the computing resources to allocate to each of the plurality of jobs based on the usage state of each of the computing resources. The usage state defines a level of use of a computing resource and is associated with at least one of a current time and an upcoming period of time.

In response to determining the one or more computing resources to allocate to each of the plurality of jobs, the method further includes (iv) accessing a database to retrieve sets of virtual binary codes, each of the sets of virtual codes associated with the at least one of the plurality of data processing services, and (v) deploying the plurality of the sets of virtual binary codes to the one or more computing resources allocated to each of the plurality of jobs, wherein the deployed sets of virtual binary codes are executed at the application layer of the one or more computing resources.

In response to (i) completing a job, or (ii) the usage state indicating a predetermined usage level at one of the one or more computing resources, the method further includes removing/calling-back a set of virtual binary codes from the one of the computing resources. Removing/calling-back the set of virtual binary codes provides for no further use of memory or processing capabilities of the one or more computing resources by the data processing service.

In specific embodiments of the method, receiving the plurality of jobs further includes receiving the plurality of jobs, each job including one or more blocks and each block comprising one or more work units. In such embodiments of the method, determining the one or more of the computing resources to allocate further includes determining the one or more of the computing resources to allocate to each of the one or more blocks of the plurality of jobs based further on a type of the one or more blocks. In other such embodiments of the method, determining the one or more of the computing resources to allocate further includes determining the one or more of the computing resources to allocate to each of the one or more blocks of the plurality of jobs based further on work requirements of the block in comparison to work requirement usage state of each of the computing resources. Work requirements include one or more of memory requirements and processing requirements.

A computer program product including a non-transitory computer-readable medium defines third embodiments of the invention. The computer-readable medium includes a first set of codes for causing a computer to receive a plurality of jobs requiring execution by one or more of a plurality of computing resources, each job associated with at least one of a plurality of data processing services. The computer-readable medium includes second set of codes for causing a computer to monitor a usage state of each of the computing resources and a third set of codes for causing a computer to determine one or more of the computing resources to allocate to each of the plurality of jobs based on the usage state of each of the computing resources. The usage state defines a level of use of a computing resource and is associated with at least one of a current time and an upcoming period of time.

The computer-readable medium includes a fourth set of codes for causing a computer, in response to determining the one or more computing resources to allocate to each of the plurality of jobs, (i) access a database to retrieve sets of virtual binary codes, each of the sets of virtual codes associated with the at least one of the plurality of data processing services, and (ii) deploy the plurality of the sets of virtual binary codes to the one or more computing resources allocated to each of the plurality of jobs. The deployed sets of virtual binary codes are executed at the application layer of the one or more computing resources.

The computer-readable medium includes a fifth set of codes for causing a computer, in response to (i) completing a job, or (ii) the usage state indicating a predetermined usage level at one of the one or more computing resources, remove a set of virtual binary codes from the one of the computing resources. Removing the set of virtual binary codes provides for no further use of memory or processing capabilities of the one or more computing resources by the virtual binary codes.

In specific embodiments of the computer program product, the third set of codes is further configured to determining the one or more of the computing resources to allocate to each of one or more blocks of the plurality of jobs based further on a type of the one or more blocks. In other specific embodiments of the computer program product the third set of codes is further configured to determining the one or more of the computing resources to allocate to each of one or more blocks of the plurality of jobs based work requirements of the block in comparison to work requirement usage state of each of the computing resources. Work requirements include one or more of memory requirements and processing requirements.

Thus, according to embodiments of the invention, which will be discussed in greater detail below, the present invention provides for an elastic grid of computing resources that can be allocated to data processing services/applications based on the current or foreseen usage/load of the computing resources. The elastic nature of the computing resource grid allows for expansion or contraction of ancillary use of the computing resources depending on the data processing requirements. Further, the present invention employs the use of virtual binary codes (i.e., agents) to execute the data processing services/applications on the computing resources at the application layer. The virtual binary codes are configured to be removed (i.e., called-back) upon completion of a job or in the event that the current or foreseen usage state of the computing resource dictates such. The removal/callback of the virtual binary codes from the computing resources provides for no residual effect on the computing resources; meaning that no remnants of the virtual binary code remain on the computing resources (i.e., no code remains in computing resource memory and, as such no processing capabilities are subsequently used). Moreover, the present invention is configured to allow for dynamic re-deployment of the virtual binary codes on other computing resources based on monitoring the current and foreseen usage of the computing resources on which the virtual binary codes are currently deployed/executing. Dynamic re-deployment of the virtual binary codes means that a data processing service can be automatically moved, mid-stream, from one computing resource to another without having to start the job over or perform redundant processing.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, computing resources are allocated to data processing services based on the current or foreseen usage of the computing resources. In this regard the present invention monitors the current and foreseen usage of computing resources, such as servers and the like, and assigns data processing services/applications to those computing resources that are currently, and will be for the foreseen future, underutilized. In this regard, a network of computing resources, such as servers and the like, act as a large elastic service grid in which data processing services/applications can be deployed to the computing resources in both horizontal and vertical fashion, such that, the grid is able to expand or contract as data processing services/applications and computing resource usage warrant. In this regard, horizontal deployment provides for the data processing service/application to be deployed based on block/work type, while vertical deployment provides for the data processing service application to be deployed based on work requirements (e.g., memory requirements, processing/CPU requirements and the like). As such, the present invention is able to call upon any computing resource within the network having available capacity to perform data processing services/applications as demand dictates.

Additionally, the present invention provides for parasitic-like deployment of virtual binary codes (i.e., "agent") at the computing resources, such that, the execution of the data processing services/applications at the computing resources occurs without any residual effect on the computing resources. In this regard, once the virtual binary codes have been deployed and executed on the computing resources, the present invention provides for the codes to be called-back or otherwise removed from the computing resources without any post-processing effect on the computing resources. As such, unlike convention Virtual Machines (VMs) or operating system-level virtualization, such as containers, no portion of the virtual binary codes remain in the computing resource memory and, as such, no processing capabilities of the computing resources are subsequently used once the virtual binary codes have been removed/called-back.

Moreover, the present invention provides for dynamic re-deployment and execution of the binary virtual codes in the event that current or foreseen computer resource usage at the presently executing computer resource dictates such. In this regard, the present invention monitors current and foreseen usage/load of the computing resources, such that, as the usage/load increases, or is foreseen to increase, the virtual binary codes data associated with processing services/applications being executed on those computing resources can be dynamically redeployed and executed on other computing resources having current or foreseen usage capacity. In this regard, data processing jobs can be stopped, mid-process, at those computing resource determined to have a current of foreseen high usage state and continued, absent the need to restart the process anew or perform redundant processing, at those computing resources at which the virtual binary codes have been re-deployed.

Figure 1:
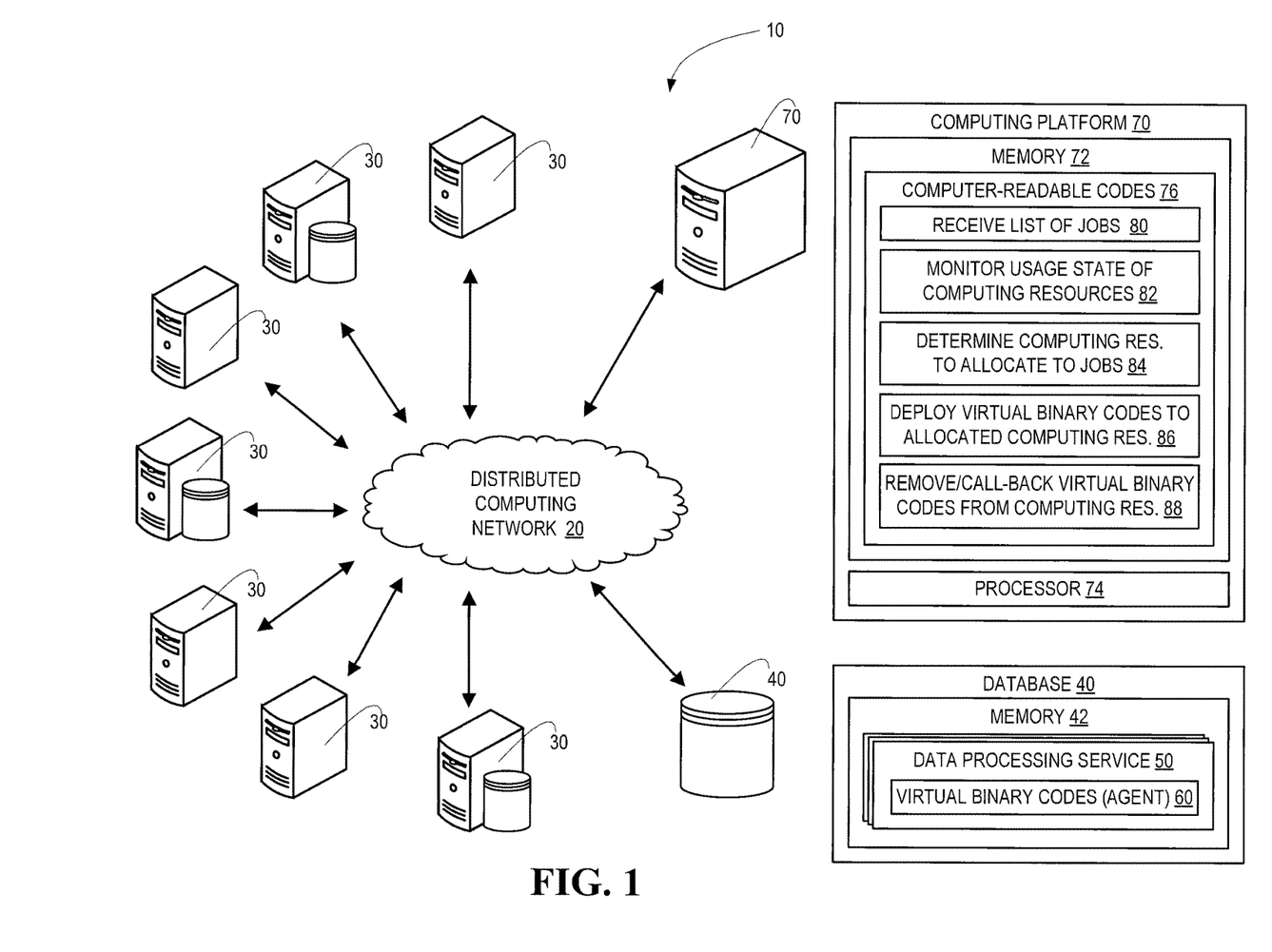
FIG. 1 provides a schematic diagram of a system for allocating computing resources for use in data processing services/applications, in accordance with embodiments of the invention.

Referring to FIG. 1 a schematic diagram is shown of a system 10 for allocating computing resources to data processing services/applications based on current and/or foreseen computing resource usage, in accordance with embodiments of the present invention. The system 10 is operated within a distributed computing network 20 that may include the Internet, and/or cellular network(s) and/or intranets. The system includes a plurality of computing resources 30, which may include, but is limited to, servers, personal computers, storage devices and the like. In a large enterprise, servers may designated for specific purposes (i.e., executing specific services/applications on a regular basis). For example, a group of servers may have the primary functions of executing a service/application, which is typically executed in the late afternoon or early evening during regular business days. During this period of time, the servers are deemed to be in a high usage state (e.g., 80-100% utilization of processing capabilities). However, during other periods of time (e.g., morning, night, weekends and the like) the servers may be underutilized (i.e., experience a low usage state). The present invention provides from using (i.e., "borrowing") these computing resources 30 during period of low usage state, so as to maximize usage of existing computing resources and lessen the need to deploy more physical and/or virtual servers throughout the computing network 20.

The system additionally includes a database 40 having a memory 42 that stores a plurality of sets of virtual binary codes 60, otherwise referred to as agents. Each set of virtual binary codes 60 are configured to perform a data processing service 50. In accordance with embodiments of the present invention, in response to determining which computing resources to allocate to a specific data processing job, the virtual binary codes 60 are deployed on the computing resources 30 and executed at the application level. The virtual binary codes 60 are deployed as a retractable arm (e.g., "retractable container"); meaning that once the codes 60 have been executed on the computing resources 60, the codes can be removed (i.e., called-back) from the computing resources 30 without leaving any remnants of the codes 60 (or, a container) at the computing resource. Unlike conventional VMs or containers, which persist in memory and may use processing capabilities after a service has been executed, in the present invention the removal/calling-back of the codes 60 results in no further use of memory or processing capabilities of the computing resources once the codes 60 have been executed. In this regard, the virtual binary codes 60 are parasitic, in that, they only use the memory and processing capabilities while the codes 60 are being executed on the computing resources 30.

The system 10 additional includes a computing platform 70, which may comprise more than one computing device, such as one or more servers or the like. The computing platform 70 includes a memory 72 with computing-readable program codes 76 stored thereon and at least one processor device 74 in communication with the memory. In accordance with embodiments of the present of the present invention, the processor(s) 74 is configured to execute the computer-readable program codes 76 to allocate computing resources 30 to data processing services. The computer-readable program codes 76 may be embodied in one comprehensive module, application, routine or the like or may be spread out amongst multiple different modules, applications, routines or the like that work in unison to allocate computing resources 30 for use in data processing services.

Specifically, the processor 74 is configured to execute the computer-readable program codes 76 to receive a plurality of jobs 80, such as a list of jobs or the like, requiring execution by the computing resources, each job is associated with at least one data processing service/application. In this regard, a list of jobs may be received on a scheduled basis, such as daily or the like or the jobs may be received on an ad hoc basis and once a job is received it is added to the list of jobs requiring execution. The jobs may, in certain embodiments of the invention, be considered secondary jobs, which are defined as jobs that are not designated for specific computing resources 30 and, thus, may be executed on any suitable computing resource 30 within the computing network 20 that has requisite current and/or foreseen usage/load capacity.

Further, the processor 74 is configured to execute the computer-readable program codes 76 to monitor the usage state 82 of each of the computing resources 30. The usage state defines the current and/or foreseen use level (i.e., load capacity) of the computing resource 30. In this regard, the present invention is able to monitor the current level of processing/CPU usage and/or memory usage, as well as, assess or predict the foreseen usage state of the computing resource in the immediate future (i.e., the period of time during which the jobs requiring processing needs to be executed). In this regard, monitoring includes determining how long a current data processing operation being performed on a computing resource will last, determining regularly scheduled data processing times (e.g., time of day, time of week, time of month and the like), determining the likely length of an upcoming/scheduled data processing operation (based on the size of the data file to be processed or the like) and the like. In addition, as a result of the monitoring 82, the processor 74 is configured to execute the computer-readable program codes 76 to determine which computing resources 30 to allocate 84 to each of the jobs based on the current and/or foreseen usage state of each of the computing resources 30.

Moreover, in response to determining which computing resources 30 to allocate to which data processing jobs, the processor 74 is configured to execute the computer-readable program codes 76 to access the database 60 to retrieve the virtual binary codes 60 associated with the data processing services required of the jobs and deploy 86 the virtual binary codes 60 to the allocated computing resources 30. Once deployed, the virtual binary codes 60 remain in communication with the system 10 during the execution of the virtual binary codes 60 at the application layer of the computing resources 30. In this regard, while executing, the virtual binary codes 60 are communicating the results of the data processing, in the form of metadata, back to a central data repository (not shown in FIG. 1). Additionally, in response to (i) completion of the job, or (ii) the current and/or foreseen usage state indicating a predetermined usage level (details of which are described in relation to FIGS. 3 and 5), the processor 74 is configured to execute the computer-readable program codes 76 to remove (i.e., call-back or retract) the virtual binary codes 60 from the computing resource 30. As previously described removal/calling-back of the codes 60 provides for no further use of memory or processing capabilities of the computing resources by the data processing service. In other words, no remnants of the virtual binary codes 60 remain in computing resource memory after the codes 60 have been executed and removed/called-back. As a result, the memory capacity and/or processing capabilities are not diminished as result of the virtual binary codes 60 being executed on the computing resources 30.

Figure 2:
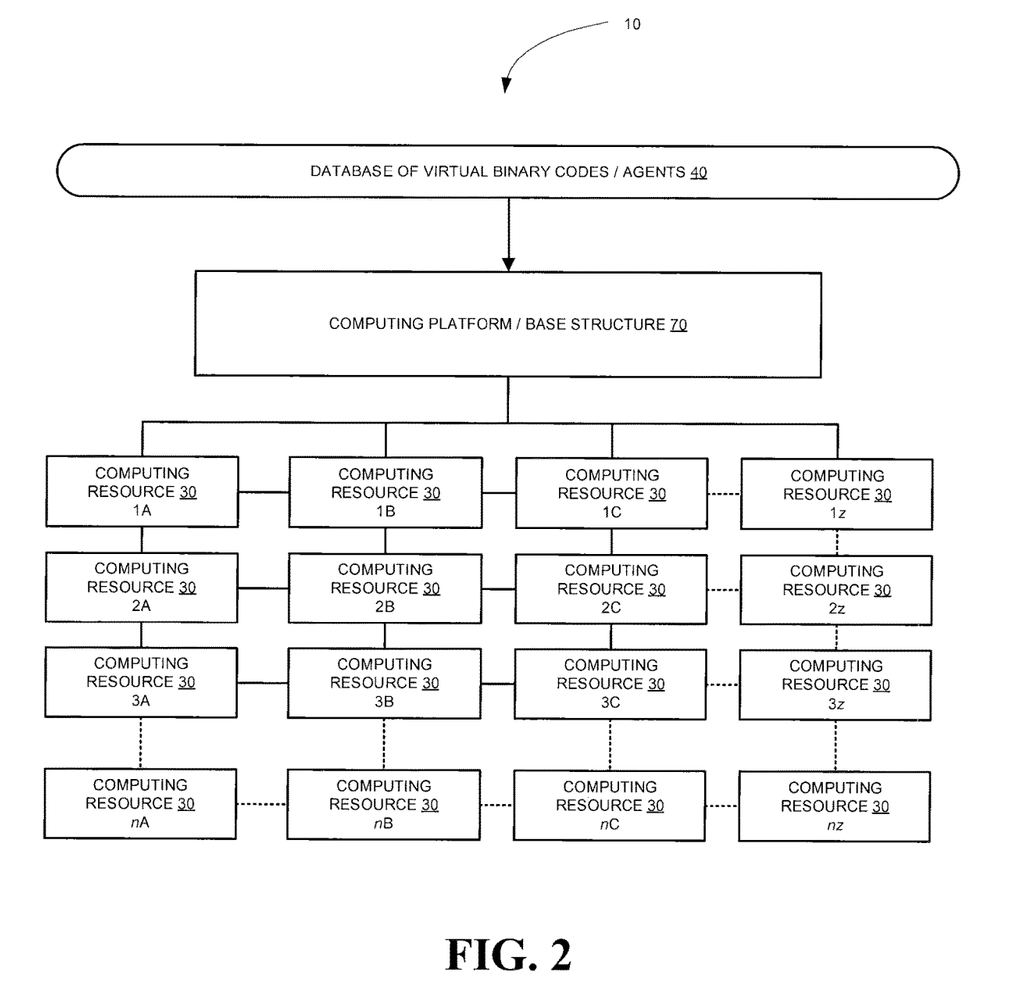
FIG. 2 provides a schematic diagram of the elastic service grid for allocating computing resources, in accordance with alternate embodiments of the invention.

Referring to FIG. 2 a more detailed schematic diagram is shown of a system 10 for allocating computing resources for use in data processing services, highlighting the elastic service grid for allocating computing resources, in accordance with embodiments of the invention. The system includes a database 40 of virtual binary codes (i.e., agents) that are associated with data processing services/application. In response to a job requiring the data processing service, the database is accessed, associated virtual binary codes are retrieved and deployed on allocated computing resources. Once deployed, the virtual binary codes are executed at the application layer and be removed/called-back from the computing resources on demand or at completion of the job, such that, the use of the virtual binary codes at the computing resources occurs without any subsequent impact on the processing capabilities or memory capacity (i.e., no portion of the code remains in computing resource storage once the codes have been executed and removed).

The system 10 further includes a computing platform 70, otherwise referred to a base structure, which is configured to act as the controlling entity for allocating computing resources, deploying requisite virtual binary codes, removing/calling-back the virtual binary codes and collecting data processed by the virtual binary codes at the allocated computing resources.

The system 10 implements a plurality of computing resources 30 that exist as an elastic service grid in which any computing resource within the service can be called upon/allocated to a job based, at least, on the usage state of the computing resources. The elastic nature of the service grid means that more computing resources may be called-upon/allocated based on a higher demand for data processing capabilities and less computing resources may be called-upon/allocated based on a lower demand for data processing capabilities.

In specific embodiments of the invention, a data processing service job may comprise multiple blocks, with each block comprising a number of work units. The blocks within a job may associated with a different data processing operations or services (i.e., different types of blocks) and, as such, each block may require a different amount of computing resource usage. In such embodiments of the invention, each different type of block may be allocated to a different horizontal computing resource within the elastic service grid (e.g., 1A, or 1B, or 1C. etc.) and each block may require deployment and execution of different virtual binary codes.

Additionally, the blocks within a job may have different processing/memory requirements (i.e., work requirements), for example one block may be processing/CPU intensive, another block may be memory intensive, another block may be both processing/CPU intensive and memory intensive and so one. In such embodiments of the invention, each block having different work requirements may be allocated to a different vertical computing resource within the elastic service grid (e.g., 1A, or 2A, or 3A, etc.).

In such instances in which a job comprises multiple different blocks, the individual computing resources allocated to the block may communicate results of the data processing back to the computing platform 70 and the computing platform may compile/roll-up the data processing results or, in other embodiments of the invention, each lower hierarchy computing resource within a horizontal or vertical row of the elastic service grid may communicate results to a next highest computing resource for the purpose of systematically compiling/rolling-up the results of the data processing, prior to communicating the overall data processing results from the highest hierarchy computing resource to a central data repository.

Figure 3:
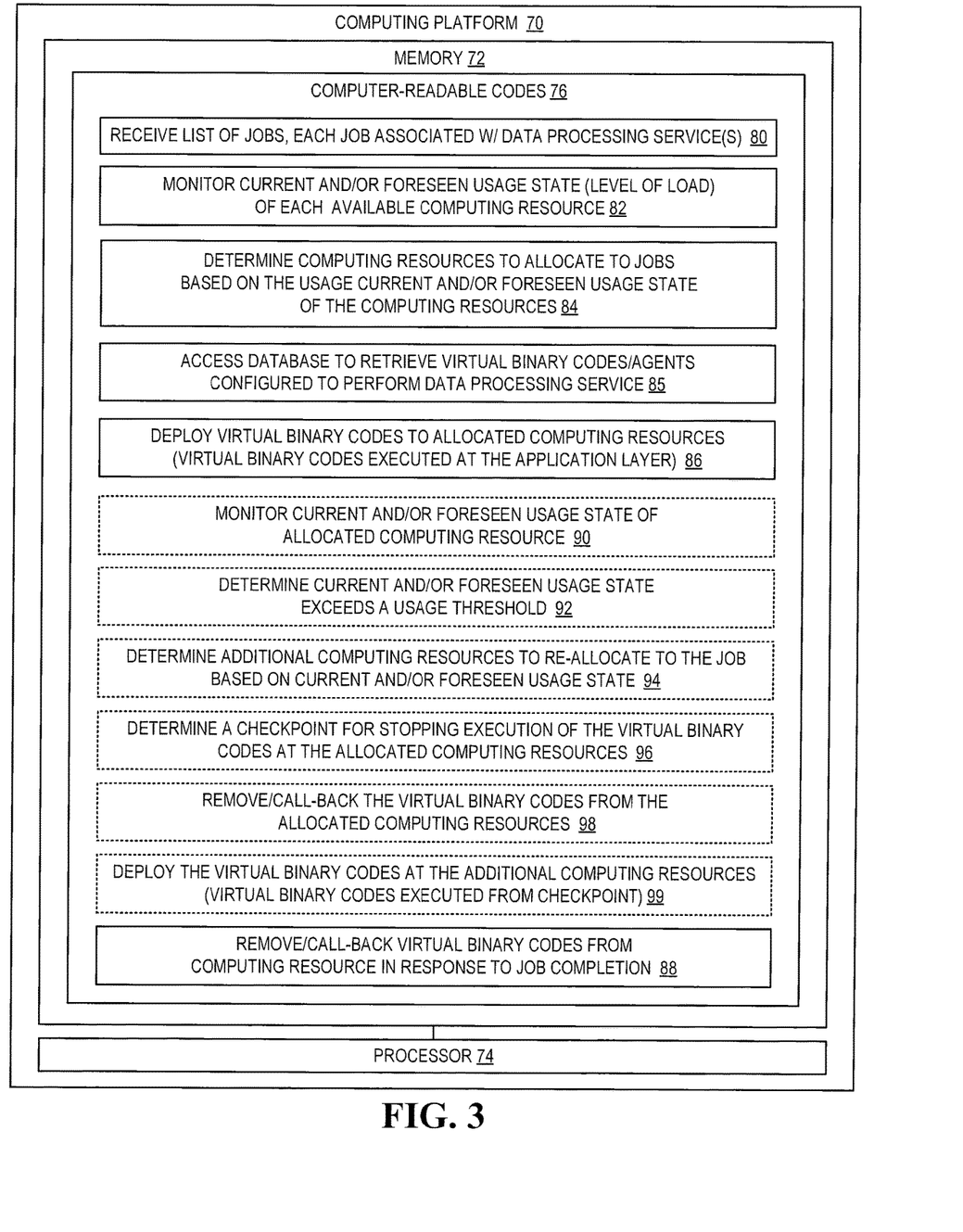
FIG. 3 provides a block diagram of a computing platform configured for allocating computing resources for use in data processing services/applications, in accordance with embodiments of the invention.

Referring to FIG. 3 a detailed block diagram of the computing platform 70 is depicted, in accordance with embodiments of the present invention. In addition to providing more details to the computer resource allocation process, FIG. 3 provides various optional embodiments of the system. As previously discussed, the computing platform 70, which may comprise one or more apparatus, devices or the like is configured to execute computer-readable program codes 76 (i.e., algorithms, such as applications, modules, routines, and the like. Computing platform 76 includes memory 72, which stores the computer-readable program codes 76 thereon. The memory 72 may comprise volatile and non-volatile memory, such as read-only and/or random-access memory (RAM and ROM), EPROM, EEPROM, flash cards, or any memory common to computer platforms). Moreover, memory 72 may comprise cloud storage, such as provided by a cloud storage service and/or a cloud connection service.

Further, computing platform 70 also includes one or more processors 74, which may be application-specific integrated circuits ("ASICs"), or other chipsets, logic circuits, or other data processing device(s). Processor 74 may execute an application programming interface ("API") (not shown in FIG. 3) that interfaces with any resident programs (i.e., computer-readable program codes 76) stored in the memory 72 of the computing platform 70.

Processor 74 may include various processing subsystems (not shown in FIG. 3) embodied in hardware, firmware, software, and combinations thereof, that enable the functionality of the computing platform 70 and the operability of the computing platform 70 on the distributed computing network 20 (shown in FIG. 1). For example, processing subsystems allow for initiating and maintaining communications and exchanging data with other networked devices, such as computing resources 30 (shown in FIG. 1). For the disclosed aspects, processing subsystems of processor 74 may include any subsystem used in conjunction with computer-readable program codes 76 and related, codes, routines, sub-routines, algorithms, sub-algorithms, modules, sub-modules thereof.

Computer platform 70 may additionally include a communications module (not shown in FIG. 3) embodied in hardware, firmware, software, and combinations thereof, that enables electronic communications between the computing platform 200 and other platforms, apparatus and/or devices, such computer resources 30 and database 40 (shown in FIG. 1). Thus, communication module may include the requisite hardware, firmware, software and/or combinations thereof for establishing and maintaining a network communication connection.

The processor 74 is configured to execute the computer-readable program codes 76 to receive a plurality of jobs 80, such as a list of jobs or the like, requiring execution by the computing resources, each job is associated with at least one data processing service/application.

Further, the processor 74 is configured to execute the computer-readable program codes 76 to monitor the usage state 82 of each of the computing resources. The usage state defines the current and/or foreseen use level (i.e., load capacity) of the computing resource. In this regard, the present invention is able to monitor the current level of processing/CPU usage and/or memory usage, as well as, assess or predict the foreseen usage state of the computing resource in the immediate future (i.e., the period of time during which the jobs requiring processing needs to be executed).

In addition, as a result of the monitoring 82, the processor 74 is configured to execute the computer-readable program codes 76 to determine which computing resources 30 to allocate 84 to each of the jobs based, at least, on the current and/or foreseen usage state of each of the computing resources. In other embodiments of the invention, other factors may be used to determine which computing resources to allocate 84 to the jobs. Such other factors, may include but are not limited to the location of the computing resources (i.e., proximity of the computing resources to where the data processing service originates), the priority of the primary data processing operations performed at the computing resource (i.e., the likelihood of the primary processing operation taking priority over the data processing service/application) and the like. In addition, the requirements of the data processing service/application and/or job may dictate which of the computing resources to allocate 84 to the jobs. For example, data processing service/application and/or jobs that are processing-intensive and/or memory-intensive may be allocated to resources that specific usage characteristics available (i.e., required amount of CPU and/or memory available).

In additional embodiments of the invention, the determination of which resources to allocate 84 to each of the jobs may be dependent upon configuration of the entity having control over the computing resource (e.g., the entity associated with the primary/designated service/application executed on the computing resource). For example, in specific embodiments of the invention, the entity having control of the computing resource can configure one or more of their resources to be available (i.e., subscribe) for usage-based resource allocation (i.e., become part of the elastic grid). Such configuration may be permanent or temporal, i.e., the resource owner may choose to dynamically make one or more of their resources unavailable (i.e., unsubscribe) for resource allocation based on perceived or known resource need. In other embodiments of the invention, the computing resource itself may determine its availability based on rules and/or conditions that define criteria for resource allocation availability. In other words, the computing resource may opt-in/subscribe to the elastic service grid if certain conditions/criteria are met (or not met) and/or the computing resource may opt-out/unsubscribe to the elastic service grid if certain conditions criteria are not met (or met). In such embodiments of the invention, the conditions/criteria may be defined by the entity in control of the computing resource and/or the entity in control of the overall elastic service grid.

In response to determining which computing resources 30 to allocate to which data processing jobs, the processor 74 is configured to execute the computer-readable program codes 76 to access a database to retrieve 85 the virtual binary codes 60 configured to perform the data processing services required of the jobs and deploy 86 the virtual binary codes to the allocated computing resources. As previously discussed, once deployed, the virtual binary codes remain in communication with the computing platform 70 (base structure of FIG. 2) during the execution of the virtual binary codes at the application layer of the computing resources 30. In this regard, while executing, the virtual binary codes are communicating/uploading the results of the data processing, in the form of metadata, back to a central data repository (not shown in FIG. 3). Such results include, but are not limited to, job state and status and/or work units.

Moreover, in alternate embodiments of the system, the processor 74 is configured to monitor job state/status and/or work units to determine if the virtual binary codes are performing correctly, while in other embodiments of the invention the virtual binary codes may be configured to communicate an error indication to the processor 74 in the event that the virtual binary codes are not performing properly. In such embodiments of the invention, the processor 74 is configured to determine which work unit(s) have been successfully completed and to re-ploy the virtual binary codes at the allocated computing resources (and re-execute only those work units that were not successfully completed or remain to be completed) and/or determine additional computing resources for re-allocation based on the errors/problems at the initially allocated computing resources.

While the codes are being executed on the computing resources, the computing resources are continually monitored 90 to determine the current and/or foreseen usage state of the allocated computing resources. Such monitoring may include determining the current processing and memory utilization, as well as, determining upcoming scheduled data processing operations and related attributes (e.g., start time for the upcoming data processing operation, duration of the upcoming data processing operation, processing and/or memory requirements of the upcoming data processing operation, and the like). Thus, the processor 74 is configured to execute the computer-readable program codes 76 is configured to determine that the current and/or foreseen usage state (load capacity) exceeds a usage threshold 92, the usage threshold may be predetermined or dynamically assigned at the time of the determination based on system/user requirement. In this regard, while the virtual binary codes are executing on a computing resource, if a determination is made that the current usage state has exceeded a threshold or is foreseen to exceed the threshold in the immediate future (i.e., prior to completion of the job), re-allocation of the computing resources occurs.

Re-allocation of the computing resource includes the processor 74 being configured to execute the computer-readable program codes 76 to determine additional computing resources to re-allocate 94 to the job based on the current of foreseen usage state. Additionally, other factors may be used to determine the additional computing resources to re-allocate to the job, such as, but not limited to, the location of the additional computing resources (i.e., proximity of the additional computing resources to where the data processing service originates), the priority of the primary data processing operations performed at the prospective additional computing resource (i.e., the likelihood of the primary processing operation taking priority over the data processing service/application associated with the job), and the like.

In response to determining the need to re-allocate computing resources, the processor 74 is configured to execute the computer-readable program codes 76 to determine a checkpoint 96 in the virtual binary codes at which the job will be stopped at the currently allocated computing resources. The virtual binary codes are configured with a plurality of checkpoints which allow for the codes to be stopped at one computer resource at the checkpoint and continued, seamlessly, at another computing resource at a point beyond the checkpoint. The use of such checkpoints allows for the job to be seamlessly moved from one computing resource to another computing resource without having to start the job over or perform redundant processing of portions of the jobs. Further, the processor 74 is configured to execute the computer-readable program codes 76 to remove/call-back 98 the virtual binary codes from the currently allocated computing resources and deploy 99 the virtual binary codes at the additional computing resources. The additional computing resources will execute the codes from a point beyond the checkpoint. The checkpoint may be stored within the virtual binary codes or the additional computing resources may receive communication from the base structure/computing platform 70 indicating the checkpoint.

Additionally, in response to completion of the job (at the initial allocated computing resources or at the additional re-allocated computing resources), the processor 74 is configured to execute the computer-readable program codes 76 to remove (i.e., call-back or retract) the virtual binary codes 60 from the computing resource 30. As previously described removal/calling-back of the codes 60 provides for no further use of memory or processing capabilities of the computing resources by the data processing service. In other words, no remnants of the virtual binary codes 60 remain in computing resource memory after the codes 60 have been executed and removed/called-back. As a result, the memory capacity and/or processing capabilities are not diminished as result of the virtual binary codes 60 being executed on the computing resources 30.

Moreover, an ancillary system may be implemented to track the performance/reliability of computing resources within in the overall elastic service grid and the reliability of the computing resources may be used as an additional determinative factor in determining which computing resources to allocate to a job. Performance/reliability may include, but is not limited to, the instances/volume of errors, nature/type of errors, the efficiency (e.g., time to complete a job and/or instances of re-allocation required) and the like. In addition, the performance/reliability of the computing resources may dictate the volume of audits performed at the computing resources, such that low performing computing resource is audited more frequently and a high performing computing resource is audited less frequently.

Figure 4:
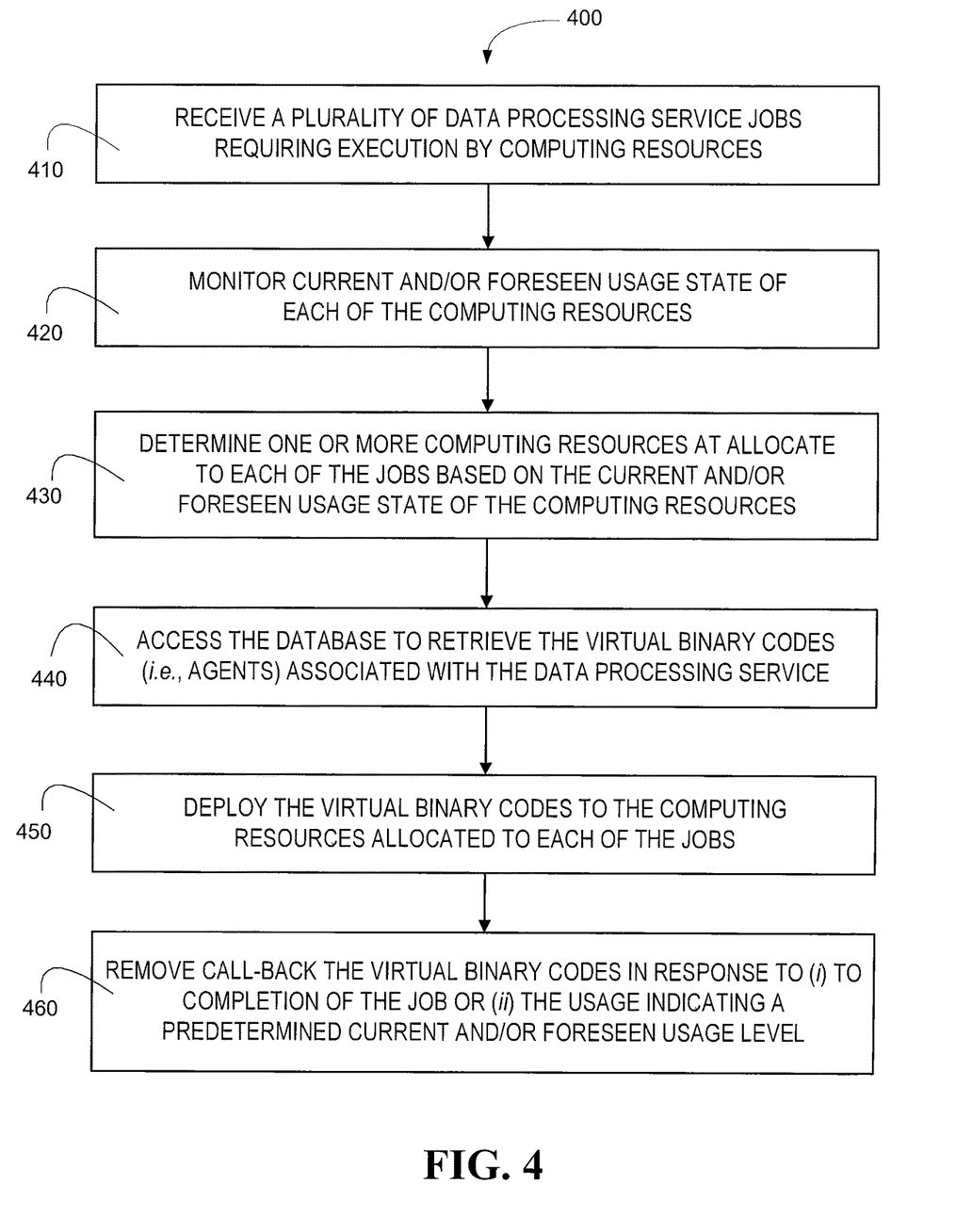
FIG. 4 provides a flow diagram of a method for allocating computing resources for use in data processing services/applications, in accordance with embodiments of the invention.

Referring to FIG. 4, a flow diagram is presented of a method 400 for allocating computing resources to data processing services, in accordance with embodiments of the invention. At Event 410, a plurality of data processing service/application jobs 80 are received that require execution by computing resources. Each job is associated with at least one data processing service/application. The jobs may be received as a list of jobs received on a scheduled basis, such as daily or the like or the jobs may be received individually on an ad hoc basis.

At Event 420, the current and/or foreseen usage state of each of the computing resources is monitored. As previously discussed, the usage state defines the current and/or foreseen use level (i.e., load capacity) of the computing resource. In this regard, the present invention is able to monitor the current level of processing/CPU usage and/or memory usage, as well as, assess or predict the foreseen usage state of the computing resource in the immediate future (i.e., the period of time during which the jobs requiring processing needs to be executed). In this regard, monitoring includes determining the length/duration of current data processing operations being performed on a computing resource, determining regularly scheduled data processing times (e.g., time of day, time of week, time of month and the like), determining the likely length of an upcoming/scheduled data processing operation (based on the known or predicted size of the data file to be processed or the like), how processing and/or memory intensive the current or scheduled data processing operation is or will be, and the like. As a result of the monitoring event, at Event 430, one or more computing resources are determined to allocate to each of the jobs based, at least, on the current and/or foreseen usage state of each of the computing resources. As previously discussed, other factors besides usage state may also considered when determining allocated computing resources, such as location of computing resources, cost of use of computing resources, primary data processing operations performed at the computing resources and the like.

In response to determining the computing resources to allocate to the data processing service jobs, at Event 440, a database is accessed to retrieve the virtual binary codes (i.e., agents) associated with the data processing services required of the jobs and, at Event 450, the virtual binary are deployed to the allocated computing resources. Deployment in this sense means that the virtual binary codes are retractable or can otherwise be called back upon completion of a job or usage state dictates such. Once deployed, the virtual binary codes remain in communication with the system during the execution at the application layer of the computing resources 30, such that, while executing, the virtual binary codes 60 are communicating the results of the data processing, in the form of metadata, back to a central data repository.

At Event 460, in response to (i) completion of the job, or (ii) the current and/or foreseen usage state indicating a predetermined or dynamic usage level, the virtual binary codes are removed (i.e., called-back or retracted) from the computing resource. As previously described removal/calling-back of the codes provides for no further use of memory or processing capabilities of the computing resources by the data processing service. In other words, no portion of the virtual binary codes remain in computing resource memory after the codes have been executed and removed/called-back. As a result, the memory capacity and/or processing capabilities of the computing resources are not diminished as result of the virtual binary codes being executed thereon.

Figure 5:
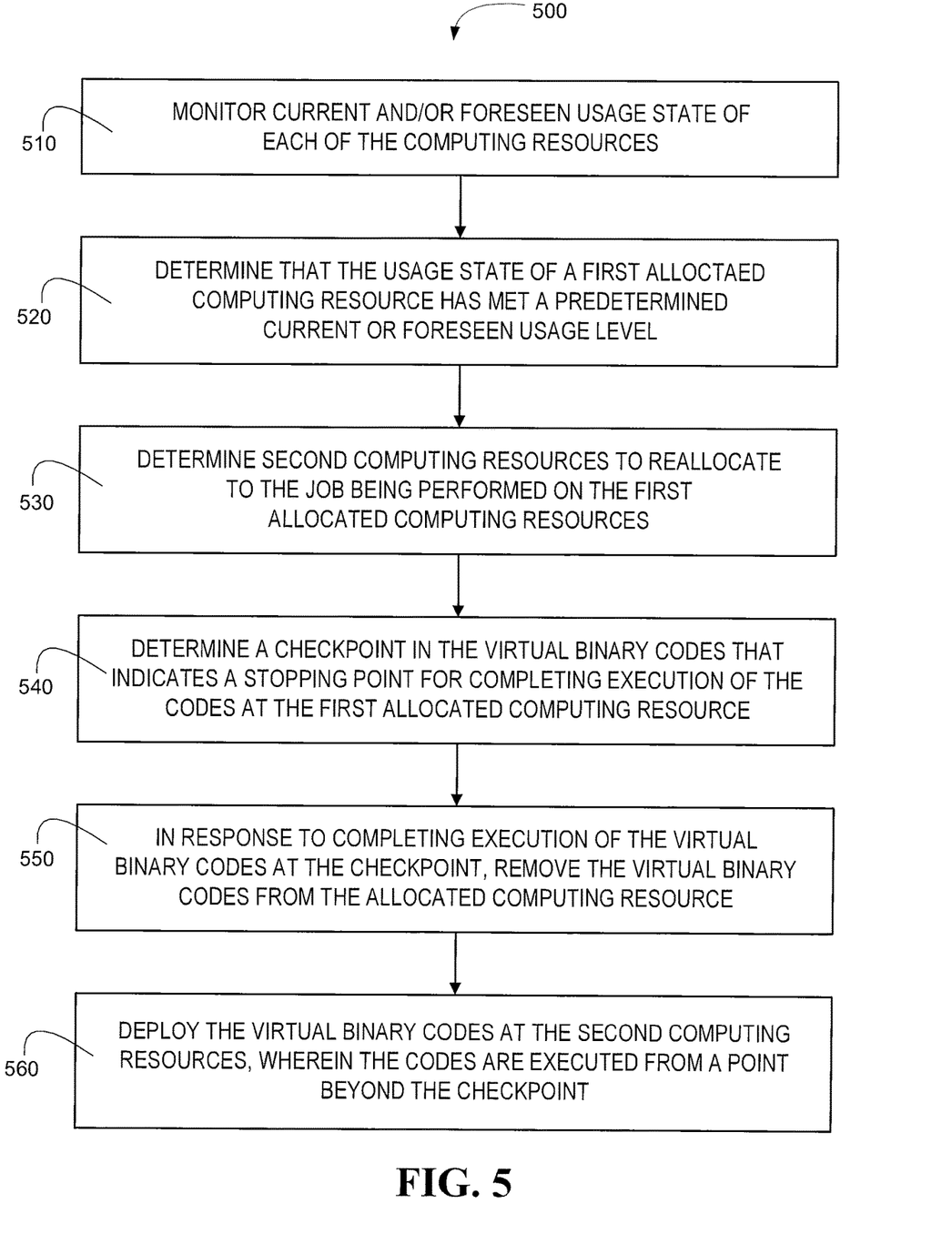
FIG. 5 provide a flow diagram of an alternate method for re-allocating computing resources for use in data processing services/applications, in accordance with embodiments of the invention.

Referring to FIG. 5 a flow diagram is presented of a method 500 for re-allocating computing resources during ongoing performance of data processing services, in accordance with embodiments of the invention. At Event 510, while the virtual binary codes are being executed at the allocated computing resources, the allocated computing resource are continually monitored to determine the current and/or foreseen usage state of the allocated computing resources. Such monitoring may include determining the current processing and memory utilization, as well as, determining upcoming scheduled data processing operations and related attributes (e.g., start time for the upcoming data processing operation, duration of the upcoming data processing operation, processing and/or memory requirements of the upcoming data processing operation, and the like).

In addition, while the virtual binary codes are being executed at the allocated computing resources, the virtual binary codes are constantly in communication with the computing platform/base structure, uploading job state and status to the computing platform/base structure. Moreover, if the allocated computing resources include memory/storage, the virtual binary codes will upload work units (i.e., portions of blocks). Such uploading of work units, allows for the block/job to continue at a second/additional computing resource once the virtual binary codes have been re-deployed without having to start anew or perform redundant data processing.

At Event 520, a determination is made that the current and/or foreseen usage state (load capacity) exceeds a predetermined or dynamically assigned usage threshold. As such, while the virtual binary codes are executing on a computing resource, if a determination is made that the current usage state has exceeded a threshold or is foreseen to exceed a threshold in the immediate future (i.e., prior to completion of the job), the process job will need to be moved from one computing resource to another (i.e., re-allocation of the computing resources is required).

At Event 530, additional/second computing resources are determined to re-allocate the job based, at least on the current of foreseen usage state of the additional/second computing resources. Additionally, other factors may be used to determine the additional/second computing resources to re-allocate the job, such as, but not limited to, the location of the additional computing resources (i.e., proximity of the additional computing resources to where the data processing service originates), the priority of the primary data processing operations performed at the prospective additional computing resource (i.e., the likelihood of the primary processing operation taking priority over the data processing service/application associated with the job), and the like. Also, as previously discussed, the determination of additional/second computing resources may be based on computing resource availability as dictated by the entity in control of the resources and/or rules/conditions applied to the computing resource.

In response to determining the need to re-allocate computing resources, at Event 540 a checkpoint is determined within the virtual binary codes at which the job will be stopped at the currently allocated computing resources. The virtual binary codes are configured with a plurality of checkpoints which allow for the codes to be stopped at one computer resource at the checkpoint and continued, seamlessly, at another computing resource at a point beyond the checkpoint. As such, the use of checkpoints allows for the job to be seamlessly moved from one computing resource to another computing resource without having to start the job over or perform redundant processing of portions of the jobs. The computing platform/base structure may determine the checkpoint based on receiving job state/status information from the virtual code and/or information on partial or completed work units within a block and/or job.

At Event 550 in response to completing execution of the virtual binary codes up to the checkpoint, the virtual binary codes are removed/called-back from the currently allocated computing resources and, at Event 560, the virtual binary codes are deployed at the additional/second computing resources. The additional computing resources will execute the codes from a point beyond the checkpoint. The checkpoint may be stored within the virtual binary codes or the additional computing resources may receive communication from the base structure/computing platform 70 indicating the checkpoint.

Thus, as described above, embodiments of the present invention provides for an elastic grid of computing resources that can be allocated to data processing services/applications based on the current or foreseen usage/load of the computing resources. The elastic nature of the computing resource grid allows for expansion or contraction of ancillary use of the computing resources depending on the data processing requirements. Further, the present invention employs the use of virtual binary codes (i.e., agents) to execute the data processing services/applications on the computing resources at the application layer. The virtual binary codes are configured to be removed (i.e., called-back) upon completion of a job or in the event that the current or foreseen usage state of the computing resource dictates such. The removal/callback of the virtual binary codes from the computing resources provides for no residual effect on the computing resources; meaning that no remnants of the virtual binary code remain on the computing resources (i.e., no code remains in computing resource memory and, as such no processing capabilities are subsequently used). Moreover, the present invention is configured to allow for dynamic re-deployment of the virtual binary codes on other computing resources based on monitoring the current and foreseen usage of the computing resources on which the virtual binary codes are currently deployed/executing. Dynamic re-deployment of the virtual binary codes means that a data processing service can be automatically moved, mid-stream, from one computing resource to another without having to start the job over or perform redundant processing.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for allocating computing resources to data processing services, the system comprising:
 a plurality of computing resources disposed within a distributed computing network;
 a database configured to store sets of virtual binary codes, each set of virtual binary codes configured to perform a data processing service;
 a computing platform including a memory device with computer-readable program code stored thereon and at least processor device in communication with the memory device, wherein the at least one processor is configured to execute the computer-readable program code to:
 receive a plurality of jobs requiring execution by the computing resources, each job associated with at least one of a plurality of data processing services;
 monitor a usage state of each of the computing resources, wherein the usage state defines a level of use of a computing resource and is associated with a current time and an upcoming period of time;

determine one or more of the computing resources to allocate to each of the plurality of jobs based, at least, on the usage state of each of the computing resources;

in response to determining the one or more computing resources to allocate to each of the plurality of jobs, access the database to retrieve a plurality of the sets of virtual binary codes, each of the plurality of sets of virtual codes (i) associated with the at least one of the plurality of data processing services and (ii) including a plurality of checkpoints at which the set of virtual codes can be stopped at a first computing resource and restarted at a second computing resource;

deploy the plurality of the sets of virtual binary codes to the one or more computing resources allocated to each of the plurality of jobs, wherein the deployed sets of virtual binary codes are executed at the application layer of the one or more computing resources;

while the virtual binary codes are executing at the application layer of the one or more computing resources, monitor the usage state of each of the computing resources;

determine the usage state of one of the computing resources will exceed a predetermined usage level for an upcoming period of time;

in response to determining the usage state of one of the computing resources will exceed the predetermined usage level for the upcoming period of time, determine a next-in-time occurrence of a checkpoint in the sets of virtual binary codes, wherein the next-in-time occurrence of the checkpoint indicates a stopping point for stopping execution of the virtual binary codes at the one of the computing resources prior to re-allocation to the second resource;

determine second computing resources to re-allocate one or more of the plurality of jobs to based on the usage state of the second computing resource;

in response to determining that the set of binary codes has reached the next-in-time occurrence of the checkpoint at the computing resource, remove the set of virtual binary codes from the one of the computing resources; and deploy the set of virtual binary codes at the second computing resource, wherein the set of virtual binary codes are executed at the second computing resource from a point beyond the checkpoint; and in response to completing a job, remove a set of virtual binary codes from the one of the computing resources, wherein removing the set of virtual binary codes provides for no further use of memory or processing capabilities of the one or more computing resources by the data processing service.

2. The system of claim 1, wherein the at least one processor is configured to execute the computer-readable program code to receive the plurality of jobs requiring execution by the computing resources, each job comprising one or more blocks, each block comprising one or more work units.

3. The system of claim 2, wherein the at least one processor is configured to execute the computer-readable program code to determine the one or more of the computing resources to allocate to each of the one or more blocks of the plurality of jobs based further on a type of the job or a type of the one or more blocks.

4. The system of claim 2, wherein the at least one processor is configured to execute the computer-readable program code to determine the one or more of the computing resources to allocate to each of the one or more blocks of the plurality of jobs based further on work requirements of the block in comparison to work requirement usage state of each of the computing resources.

5. The system of claim 4, wherein the work requirements of the block include one or more of memory requirements and processing requirements.

6. The system of claim 2, wherein the at least one processor is configured to execute the computer-readable program code to systematically compile results of each block of a job performed at different computing resources.

7. The system of claim 6, wherein the at least one processor is configured to execute the computer-readable program code to systematically compile results of the each block of a job performed at different computing resources, wherein systematically compiling the results includes at least one of compiling the results of different types of work blocks and compiling the results of blocks having different work requirements.

8. The system of claim 1, wherein the at least one processor is configured to execute the computer-readable program code to execute, from the point beyond the next-in-time occurrence of the checkpoint, the set of virtual binary codes at the second computing resource, wherein the next-in-time occurrence of the checkpoint in the sets of virtual codes is flagged in the virtual binary codes.

9. The system of claim 1, wherein the at least one processor is configured to execute the computer-readable program code to communicate the next-in-time occurrence of the checkpoint in the sets of virtual codes to the second computing resource prior to executing the set of virtual binary codes at the second computing resource.

10. The system of claim 1, wherein the at least one processor is configured to execute the computer-readable program code to communicate results of the job to a central repository.

11. The system of claim 1, determine one or more of the computing resources to allocate to each of the plurality of jobs based further on a designated availability of a resource as determined based on at least one of resource owner configuration or rules that define conditions for resource availability.

12. A method for allocating computing resources to data processing services, the method implemented by one or more computing processors and comprising:

receiving a plurality of jobs requiring execution by one or more of a plurality of computing resources, each job associated with at least one of a plurality of data processing services;

monitoring a usage state of a plurality of computing resources, wherein the usage state defines a level of use of a computing resource and is associated with at least one of a current time and an upcoming period of time;

determining one or more of the computing resources to allocate to each of the plurality of jobs based on the usage state of each of the computing resources;

in response to determining the one or more computing resources to allocate to each of the plurality of jobs, accessing a database to retrieve sets of virtual binary codes, each of the sets of virtual codes (i) associated with the at least one of the plurality of data processing services and (ii) including a plurality of checkpoints at which the set of virtual codes can be stopped at a first computing resource and restarted at a second computing resource;

deploying the plurality of the sets of virtual binary codes to the one or more computing resources allocated to each of the plurality of jobs, wherein the deployed sets of virtual binary codes are executed at the application layer of the one or more computing resources; and while the virtual binary codes are executing at the application layer of the one or more computing resources, monitoring the usage state of each of the computing resources;

determining the usage state of one of the computing resources will exceed a predetermined usage level for an upcoming period of time;

in response to determining the usage state of one of the computing resources will exceed the predetermined usage level for the upcoming period of time, determining a next-in-time occurrence of a checkpoint in the sets of virtual binary codes, wherein the next-in-time occurrence of the checkpoint indicates a stopping point for stopping execution of the virtual binary codes at the one of the computing resources prior to re-allocation to the second resource;

determining second computing resources to re-allocate one or more of the plurality of jobs to based on the usage state of the second computing resource;

in response to determining that the set of binary codes has reached the next-in-time occurrence of the checkpoint at the computing resource, removing the set of virtual binary codes from the one of the computing resources; and deploying the set of virtual binary codes at the second computing resource, wherein the set of virtual binary codes are executed at the second computing resource from a point beyond the checkpoint; and in response to completing a job, remove a set of virtual binary codes from the one of the computing resources, wherein removing the set of virtual binary codes provides for no further use of memory or processing capabilities of the one or more computing resources by the data processing service.

13. The method of claim 12, wherein receiving the plurality of jobs further comprises receiving the plurality of jobs, each job comprising one or more blocks, each block comprising one or more work units.

14. The method of claim 13, wherein determining the one or more of the computing resources to allocate further comprises determining the one or more of the computing resources to allocate to each of the one or more blocks of the plurality of jobs based further on a type of the one or more blocks.

15. The method of claim 13, wherein determining the one or more of the computing resources to allocate further comprises determining the one or more of the computing resources to allocate to each of the one or more blocks of the plurality of jobs based further on work requirements of the block in comparison to work requirement usage state of each of the computing resources, wherein work requirements include one or more of memory requirements and processing requirements.

16. A computer program product including a non-transitory computer-readable medium, the computer-readable medium comprising:

a first set of codes for causing a computer to receive a plurality of jobs requiring execution by one or more of a plurality of computing resources, each job associated with at least one of a plurality of data processing services;

a second set of codes for causing a computer to monitor a usage state of each of the computing resources, wherein the usage state defines a level of use of a computing resource and is associated with at least one of a current time and an upcoming period of time;

a third set of codes for causing a computer to determine one or more of the computing resources to allocate to each of the plurality of jobs based on the usage state of each of the computing resources;

a fourth set of codes for causing a computer to, in response to determining the one or more computing resources to allocate to each of the plurality of jobs, (i) access a database to retrieve sets of virtual binary codes, each of the sets of virtual codes (a) associated with the at least one of the plurality of data processing services and (b) including a plurality of checkpoints at which the set of virtual codes can be stopped at a first computing resource and restarted at a second computing resource, (ii) deploy the plurality of the sets of virtual binary codes to the one or more computing resources allocated to each of the plurality of jobs, wherein the deployed sets of virtual binary codes are executed at the application layer of the one or more computing resources;

a fifth set of codes for causing a computer to, while the virtual binary codes are executing at the application layer of the one or more computing resources, (i) monitor the usage state of each of the computing resources, (ii) determining the usage state of one of the computing resources will exceed a predetermined usage level for an upcoming period of time and, in response to determining the usage state of one of the computing resources will exceed the predetermined usage level for the upcoming period of time, (iii) determine a next-in-time occurrence of a checkpoint in the sets of virtual binary codes, wherein the next-in-time occurrence of the checkpoint indicates a stopping point for stopping execution of the virtual binary codes at the one of the computing resources prior to re-allocation to the second resource;

a sixth set of codes for causing a computer to determine second computing resources re-allocate to one or more of the plurality of jobs to based on the usage state of the second computing resource;

a seventh set of codes for causing a computer to, in response to determining that the set of binary codes has reached the next-in-time occurrence of the checkpoint at the computing resource, (i) remove the set of virtual binary codes from the one of the computing resources, and (ii) deploy the set of virtual binary codes at the second computing resource, wherein the set of virtual binary codes are executed at the second computing resource from a point beyond the checkpoint; and an eighth set of codes for causing a computer, in response to completing a job remove a set of virtual binary codes from the one of the computing resources, wherein removing the set of virtual binary codes provides for no further use of memory or processing capabilities of the one or more computing resources by the data processing service.

17. The computer program product of claim 16, wherein the third set of codes is further configured to determining the one or more of the computing resources to allocate to each of one or more blocks of the plurality of jobs based further on a type of the one or more blocks.

18. The computer program product of claim 17, wherein the third set of codes is further configured to determining the one or more of the computing resources to allocate to each of one or more blocks of the plurality of jobs based work requirements of the block in comparison to work requirement usage state of each of the computing resources, wherein work requirements include one or more of memory requirements and processing.

\* \* \* \* \*